(12) United States Patent
Wheelwright

(10) Patent No.: US 11,608,020 B1
(45) Date of Patent: Mar. 21, 2023

(54) VEHICLE SEAT ARMREST COUPLED AIRBAG MODULES

(71) Applicant: Autoliv ASP, Inc., Ogden, UT (US)

(72) Inventor: Terry Alan Wheelwright, Morgan, UT (US)

(73) Assignee: Autoliv ASP, Inc., Ogden, UT (US)

(*) Notice: Subject to any disclaimer, the term of this patent is extended or adjusted under 35 U.S.C. 154(b) by 0 days.

(21) Appl. No.: 17/412,010

(22) Filed: Aug. 25, 2021

(51) Int. Cl.
*B60R 21/207* (2006.01)
*B60N 2/75* (2018.01)
*B60R 21/26* (2011.01)

(52) U.S. Cl.
CPC .............. *B60R 21/207* (2013.01); *B60N 2/79* (2018.02); *B60R 21/26* (2013.01)

(58) Field of Classification Search
None
See application file for complete search history.

(56) References Cited

U.S. PATENT DOCUMENTS

| | | | |
|---|---|---|---|
| 5,492,361 A * | 2/1996 | Kim | B60R 21/207 280/730.2 |
| 5,730,458 A * | 3/1998 | Byon | B60R 21/207 280/730.2 |
| 8,924,086 B2 * | 12/2014 | Thomas | B60R 21/015 701/45 |
| 10,343,644 B2 * | 7/2019 | Dry | B60R 21/26 |
| 10,569,732 B2 * | 2/2020 | Nagasawa | B60R 21/207 |
| 10,933,836 B2 * | 3/2021 | Yoo | B60R 21/207 |
| 11,273,783 B1 * | 3/2022 | Faruque | B60R 21/2338 |
| 2018/0281724 A1 * | 10/2018 | Nagasawa | B60R 21/055 |
| 2018/0281725 A1 * | 10/2018 | Nagasawa | B60R 21/207 |

FOREIGN PATENT DOCUMENTS

| | | | | |
|---|---|---|---|---|
| DE | 102017010794 A1 | * | 7/2018 | |
| FR | 3102961 A1 | * | 5/2021 | B60N 2/753 |
| JP | 3028498 U | * | 9/1996 | |
| JP | 6852567 B2 | * | 3/2021 | |

* cited by examiner

*Primary Examiner* — Faye M Fleming
(74) *Attorney, Agent, or Firm* — Matthew D. Thayne; Thayne and Davis LLC

(57) ABSTRACT

In some embodiments, an airbag module may comprise an airbag cover configured to be positioned within a vehicle seat and comprising an opening. The opening may be configured to receive a structural element of the vehicle seat therethrough, such as an armrest mount. The module may further comprise an airbag cushion positioned within the airbag cover and configured to deploy from the airbag cover such that forces from deployment of the airbag cushion are directed applied to the structural element, in some cases directing these forces to the seat frame.

20 Claims, 9 Drawing Sheets

VEHICLE SEAT ARMREST COUPLED AIRBAG MODULES

SUMMARY

Although airbag cushions have been proposed that deploy from a vehicle seat, a variety of problems face such current solutions. For example, it may be difficult to find sufficient space within a vehicle seat for the airbag cover. In addition, deployment may result in forces being applied to portions of the seat that may require the module to be mounted to the seat using studs/bolts, or screws. Moreover, various features of a typical vehicle seat, such as armrests, may interfere with desired deployment kinematics, particularly features that are reconfigurable and may therefore present differing contact surfaces for a deploying airbag cushion.

The present inventors have therefore determined that it would be desirable to provide apparatus, systems and methods that overcome one or more of the foregoing limitations and/or other limitations of the prior art. In some embodiments, the inventive concepts disclosed herein may therefore provide an airbag module having a cover that receives a vehicle seat structural element therethrough and/or otherwise provides one or more points of contact to transfer deployment forces through the structural element into a larger portion of the seat itself, such as the seat frame.

In a more particular example of a seat-mounted airbag module according to some embodiments, the module may comprise an airbag cover configured to be positioned within a seat, of a vehicle, such as within a seat back of a vehicle seat, for example; an inflator positioned within the airbag cover; and an airbag cushion positioned within the airbag cover and configured to deploy from one lateral side of the seat back adjacent to a protruding structural element of the vehicle seat, such as an armrest mount or another portion of an armrest assembly of the vehicle seat. The airbag module may be configured to transfer forces from deployment of the airbag cushion to at least a portion of the armrest assembly or another protruding structural element during deployment. In some embodiment, these forces may be transferred via the structural element to the vehicle seat frame. Preferably the inflator is positioned behind the protruding structural element.

In some embodiments, the airbag cover may comprise an opening configured to receive a portion of the armrest or other structural element therethrough. In some such embodiments, the opening may be configured to receive an armrest mount of the armrest therethrough.

In some embodiments, the airbag cover may be configured to be coupled to the vehicle seat without use of bolts or screws.

In some embodiments, the airbag cover may comprise a clamshell cover, which may comprise a spine; a first cover piece pivotably coupled to the spine; and a second cover piece pivotably coupled to the spine. In some such embodiments, the inflator may be positioned along the spine.

In another example of an airbag module according to some embodiments, the module may comprise an airbag cover configured to be positioned within a vehicle seat. The airbag cover may comprise an opening that may be configured to receive a structural element of the vehicle seat therethrough. The module may further comprise an airbag cushion positioned within the airbag cover and configured to deploy from the airbag cover such that forces from deployment of the airbag cushion are directed applied to the structural element and/or to a frame of the vehicle seat.

In some embodiments, the structural element may comprise a portion of an armrest assembly, such as an armrest mount.

Some embodiments may further comprise an inflator. In some such embodiments, the airbag cushion may be separately coupled to the inflator on opposing sides of the inflator, such as extending about, or at least substantially about, a perimeter of the opening.

In some embodiments, the airbag cushion may be positioned within the airbag cover such that at least a portion of the airbag cushion extends about a periphery of the opening from a first side of the inflator to a second side of the inflator opposite the first side.

In some embodiments, the airbag cover may comprise a clamshell cover comprising: a spine, a first cover piece pivotably coupled to the spine, and a second cover piece pivotably coupled to the spine. In some such embodiments, the airbag cushion may be configured to deploy from along an edge of the airbag cover positioned opposite from the spine.

In an example of a vehicle seat according to some embodiments, the vehicle seat may comprise a seat base and a seat back extending from the seat base. The vehicle seat may further comprise a structural assembly comprising a protruding member extending from at least a portion of the vehicle seat. An airbag module may be positioned within the vehicle seat, which airbag module may comprise an airbag cover comprising an opening. The protruding member may extend through the opening. In some embodiments, the protruding member may be fully surrounded by the opening. An airbag cushion may be positioned within the airbag cover and may be configured to deploy from the airbag cover along one side of the vehicle seat.

In some embodiments, the protruding member may comprise an armrest. In some such embodiments, the armrest may be adjustable between upright and extended positions. Thus, preferably, the airbag cushion is configured to deploy adjacent to the armrest in either the upright or extended positions. In some embodiments, the airbag cushion may be configured to deploy adjacent to an inner surface of the armrest in the extended position.

In some embodiments, the airbag module may be positioned and configured to transfer forces from deployment of the airbag cushion to the protruding member during deployment. In some such embodiments, the airbag module may be positioned and configured to transfer reaction forces from an occupant contacting the airbag cushion during deployment to the protruding member and from the protruding member to a frame of the vehicle seat during deployment.

In some embodiments, the airbag module may be positioned within the seat back.

In some embodiments, the airbag cover may be coupled to the seat back without use of bolts or screws. In some such embodiments, the airbag module may further comprise an inflator configured to inflate the airbag cushion. In some such embodiments, the inflator may be coupled to the seat back using one or more inflator studs.

The features, structures, steps, or characteristics disclosed herein in connection with one embodiment may be combined in any suitable manner in one or more alternative embodiments.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

A detailed description of apparatus, systems, and methods consistent with various embodiments of the present disclosure is provided below. While several embodiments are described, it should be understood that the disclosure is not limited to any of the specific embodiments disclosed, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

As used herein, the term "substantially" refers to the complete or nearly complete extent or degree of an action, characteristic, property, state, structure, item, or result to function as indicated. For example, an object that is "substantially" cylindrical or "substantially" perpendicular would mean that the object/feature is either cylindrical/perpendicular or nearly cylindrical/perpendicular so as to result in the same or nearly the same function. The exact allowable degree of deviation provided by this term may depend on the specific context. The use of "substantially" is equally applicable when used in a negative connotation to refer to the complete or near complete lack of an action, characteristic, property, state, structure, item, or result. For example, structure which is "substantially free of" a bottom would either completely lack a bottom or so nearly completely lack a bottom that the effect would be effectively the same as if it completely lacked a bottom.

Similarly, as used herein, the term "about" is used to provide flexibility to a numerical range endpoint by providing that a given value may be "a little above" or "a little below" the endpoint while still accomplishing the function associated with the range.

The embodiments of the disclosure may be best understood by reference to the drawings, wherein like parts may be designated by like numerals. It will be readily understood that the components of the disclosed embodiments, as generally described and illustrated in the figures herein, could be arranged and designed in a wide variety of different configurations. Thus, the following detailed description of the embodiments of the apparatus and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified. Additional details regarding certain preferred embodiments and implementations will now be described in greater detail with reference to the accompanying drawings.

Figure 1A:
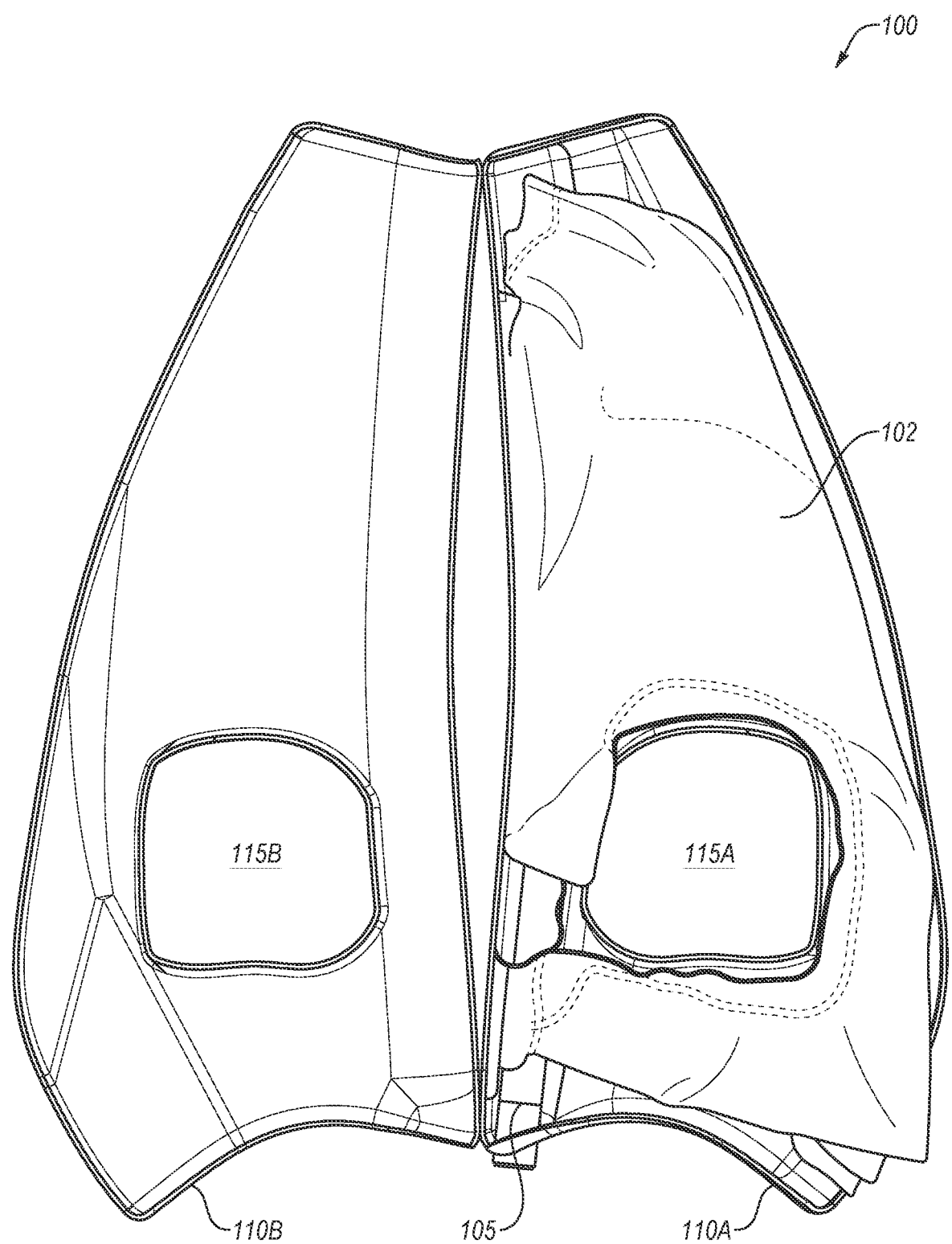
FIG. 1A depicts an example of a seat-mounted airbag module in an open configuration according to some embodiments.

FIG. 1A depicts an airbag module 100 comprising an airbag cushion 102 positioned within an airbag cover 110 configured to be positioned within or otherwise coupled to a vehicle seat according to some embodiments. Airbag cover 110 is defined by first and second airbag cover pieces 110A and 110B, respectively, that are configured to be opened and closed similar to a clamshell with an open side and a closed side or spine having one or more hinged and/or pivotable portions.

As shown in FIG. 1A, each of cover pieces 110A and 110B comprises a respective opening 115N/115B, respectively, through which a structural element of the seat may extend, as discussed in greater detail below. In preferred embodiments, for example, a portion of an armrest assembly may extend through openings 115A/115B, which, as shown in FIG. 1B, combine to define a single opening 115.

Figure 1B:
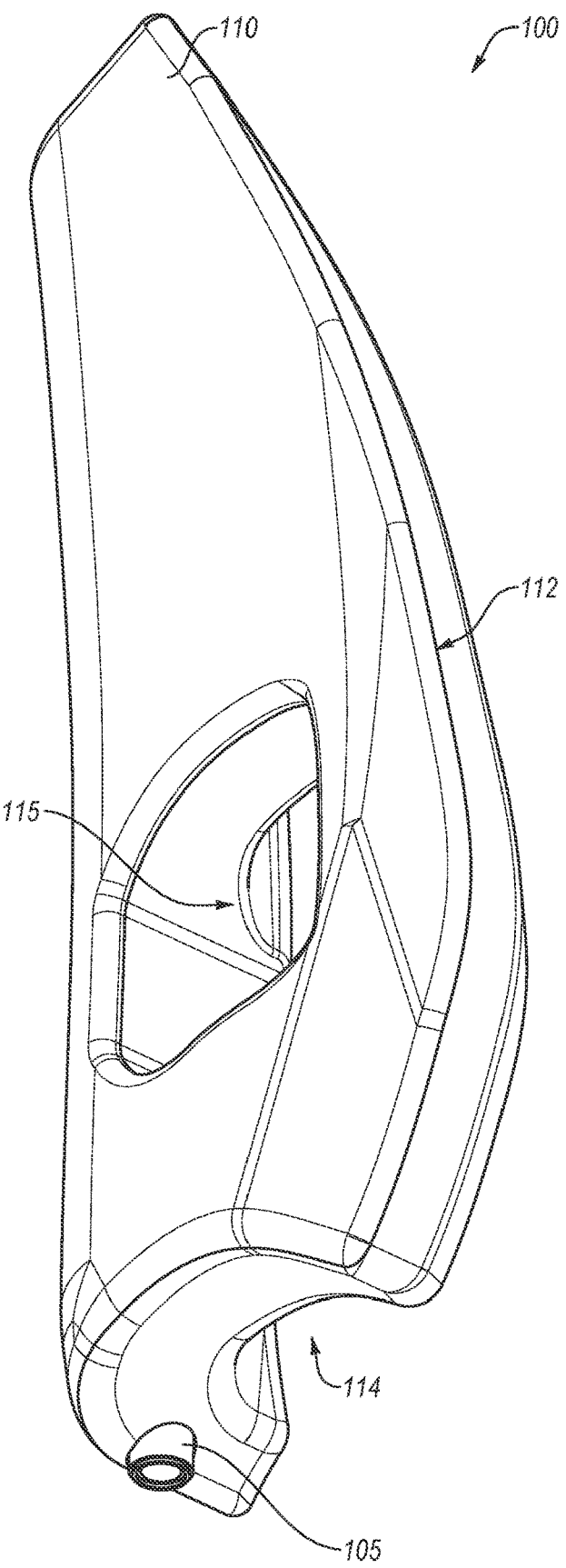
FIG. 1B is a perspective view of the seat-mounted airbag module of FIG. 1A in a closed configuration.

As shown in both FIGS. 1A and 1B, an inflator 105 may be positioned within an inner chamber of cover 110 defined by pieces 110A and 110B. In the depicted embodiments, inflator 105 is positioned along the spine region of the cover 110, which may be the pivoting portion of the cover 110 and therefore expected to be relatively stable during deployment. Airbag cushion 102 may be wrapped about one or both of openings 115A/115B, as shown in FIG. 1A. Thus, there may be a negative portion of cushion 102 formed by sewing a portion of the cushion 102 that extends about, or at least substantially about, a perimeter of opening 115, or the cushion 102 may be simply folded or otherwise positioned within cover 110 such that it extends about, or at least substantially about, the perimeter of opening 115.

As also shown in both FIGS. 1A and 1B, a portion of inflator 105 may extend from an opening formed in cover 110 to allow for providing a suitable electrical connection, if desired. Because in preferred embodiments cover 110 may be defined by a relatively rigid and/or strong material, such as a rigid thermoplastic material, positioning a portion of inflator through the aforementioned opening may further provide stability to the assembly during deployment.

As shown in the drawings, inflator 105 is preferably positioned in the seat 10 at a location adjacent to and/or at least substantially behind a projecting portion of an armrest assembly or another protruding structural element.

It may also be desired that cushion 102 be coupled to both inflator 105 and to one or more portions of cover 110. For example, in preferred embodiments, there may be clips, fasteners, or other coupling means formed along both an upper and lower portion of cover 110 to which cushion 102 may be coupled. In some embodiments, however, the inflator 105 itself may serve as one coupling location, in which case the cushion 102 may, in some embodiments, only be coupled directly to an upper portion of cover 110. This may allow deployment forces to be applied initially to the inflator 105 and then from the inflator to a portion of an armrest assembly or another seat structural element, as discussed below.

As shown in FIG. 1B, a leading edge of cover 110 may comprise a slit 112 that, as discussed below, may be configured to pivot open sufficiently to allow the inflating airbag cushion 102 therein to deploy adjacent to a vehicle occupant. As also shown in FIG. 1B, some embodiments may comprise one or more shaped features, such as groove 114, to accommodate portions of a vehicle seat. In the depicted embodiment, as will be more readily apparent in connection with later figures, groove 114 may be configured to receive a portion of a vehicle seat so that cover 110 can extend about both opposing sides of the vehicle seat and accommodate a suitable portion of the vehicle seat therewithin.

Figure 2A:
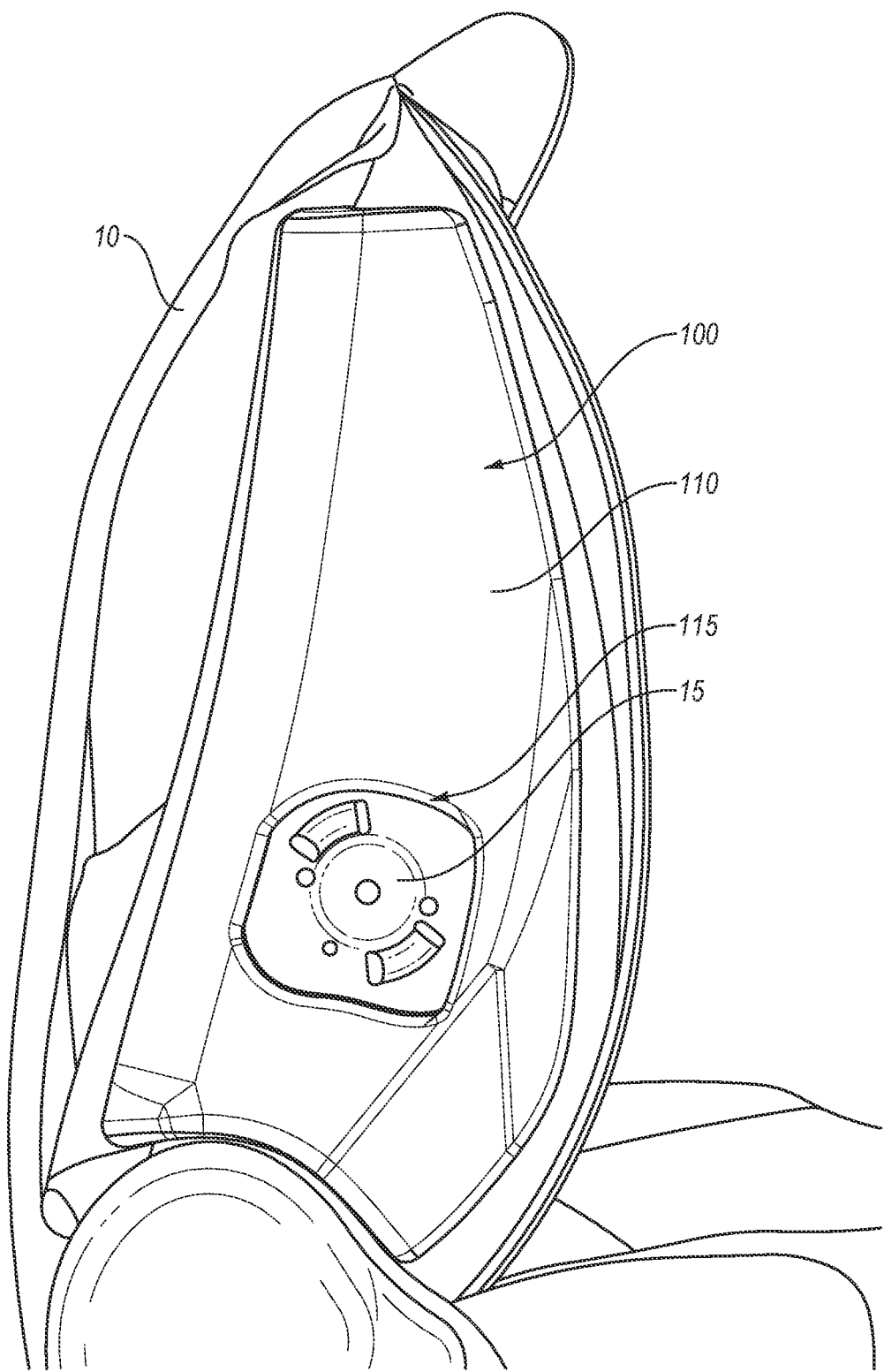
FIG. 2A depicts a seat having an armrest mount extending through an opening of an airbag module according to some embodiments.
Figure 2B:
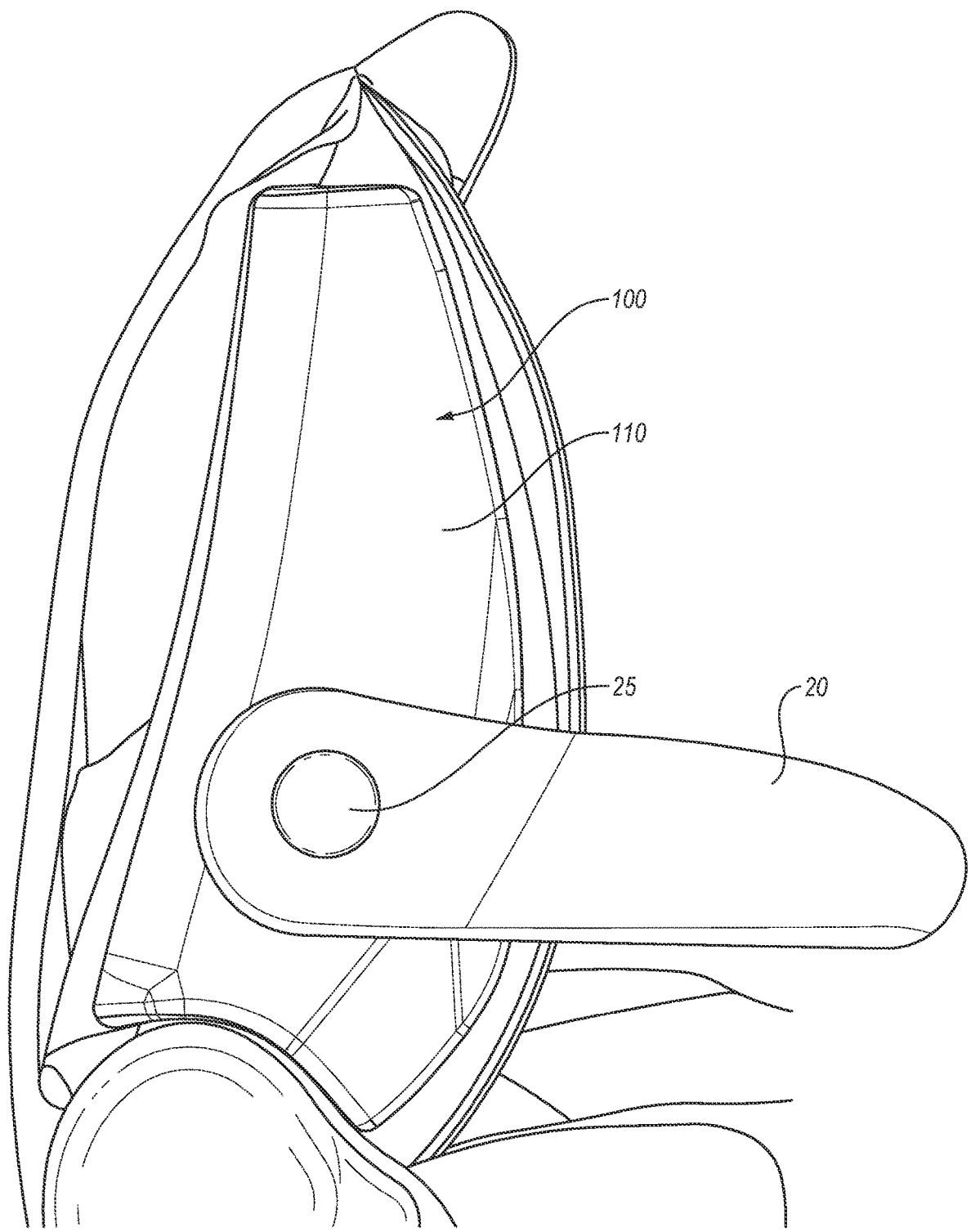
FIG. 2B depicts the airbag module of FIG. 2A with an armrest extending from the armrest mount.

FIGS. 2A and 2B depict a vehicle seat 10 with airbag module 100 positioned therein. More particularly, FIG. 2A depicts cover 110 positioned within a seatback portion of vehicle seat 10 along one side thereof. It should be understood, however, that cover 110 may be positioned along either side, or both sides, of vehicle seat 10, or may be positioned in another portion of the vehicle seat 10, such as the base portion of the seat 10, in contemplated alternative embodiments. It should also be understood that cover 110 may be positioned within a seatback comprising foam encapsulated in a seat cover, or may be positioned in other seatbacks of vehicle seats, such as seats of autonomous vehicles, which may lack these features.

As shown in FIG. 2A, an armrest mount 15 extends through opening 115, which, again, may be defined by two separate openings formed in pivotable pieces together defining airbag cover 110 in some preferred embodiments. Preferably, armrest mount 15, or another structural element of seat 10, extends through opening 115 so as to engage a portion of cover 110 defining opening 115 about an entire perimeter of opening 115, or at least about opposing sides of cover 110 defining opening 115, with relatively little tolerance. In other words, it may be preferred for certain applications that the armrest mount 15, or another structural element of seat 10, have a shape and size that is at least substantially identical (slightly smaller, of course, to allow for this element to extend through opening 115) to the size and shape of opening 115.

In this manner, deployment forces may be transferred to armrest mount 15 or whichever alternative structural element is extending through opening 115 or otherwise extends adjacent to cover 110 (in some embodiments, for example, opening 115 need not be an opening having a full perimeter, as shown in the figures). This may provide a number of benefits. For example, this may allow cover 110 to be positioned within seat 10 without the need for typical bolts or other rigid fasteners because the deployment forces may be transferred from the armrest mount 15 or another structural element to the seat frame. Thus, some embodiments may use simple clips (not shown) to secure the module 100 to the seat 10. Of course, in some embodiments, fasteners may be used as well, or alternatively. For example, some embodiments may comprise typical inflator studs or other fasteners, but in some cases without use of additional fasteners that specifically extend from and/or are directly coupled to the housing 110 itself.

FIG. 2B illustrates module 100 with armrest 20 coupled to armrest mount 25 in an extended configuration. As shown in later figures, module 100 is preferably configured to deploy adjacent one or both sides of a vehicle seat with an armrest 20 or, in other embodiments, another structural element, extending through at least a portion of the housing 110 in any configuration, such as, for the depicted embodiment, in either a retracted configuration or the extended configuration shown in FIG. 2B. In some embodiments, the housing 110 may also be configured to replace or otherwise provide support to the seat 10, such as providing or supporting a bolster space to the seat 10.

Figure 3A:
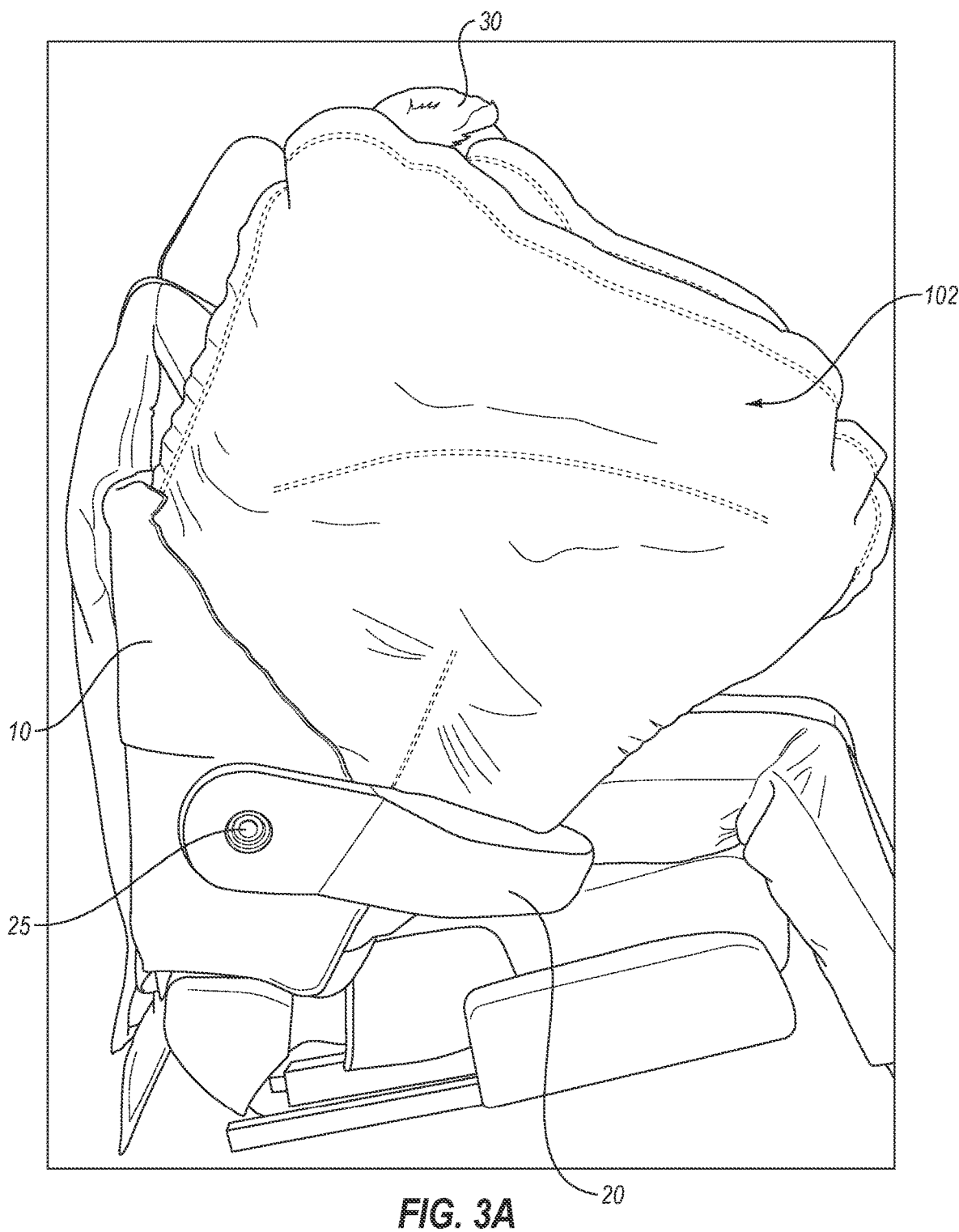
FIG. 3A depicts a seat-mounted and armrest coupled airbag module during deployment with the armrest in an extended configuration.

FIG. 3A illustrates the airbag module 100 following deployment. Thus, airbag cushion 102 is shown extending and being deployed from a front leading edge of housing 110 (again, through slit/opening 112 shown in FIG. 1B). Given the clamshell configuration previously mentioned and best seen in FIGS. 1A and 1B, the force of the inflating airbag cushion 102 against the inner walls of the housing 110 may result in section 110A pivoting open with respect to portion 110B sufficiently to allow the inflating cushion 102 to exit housing 110. As also shown in FIG. 3A, cushion 102 may be configured to deploy adjacent to armrest 20 in the depicted, extended configuration without the armrest interfering with desired deployment characteristics.

Figure 3B:
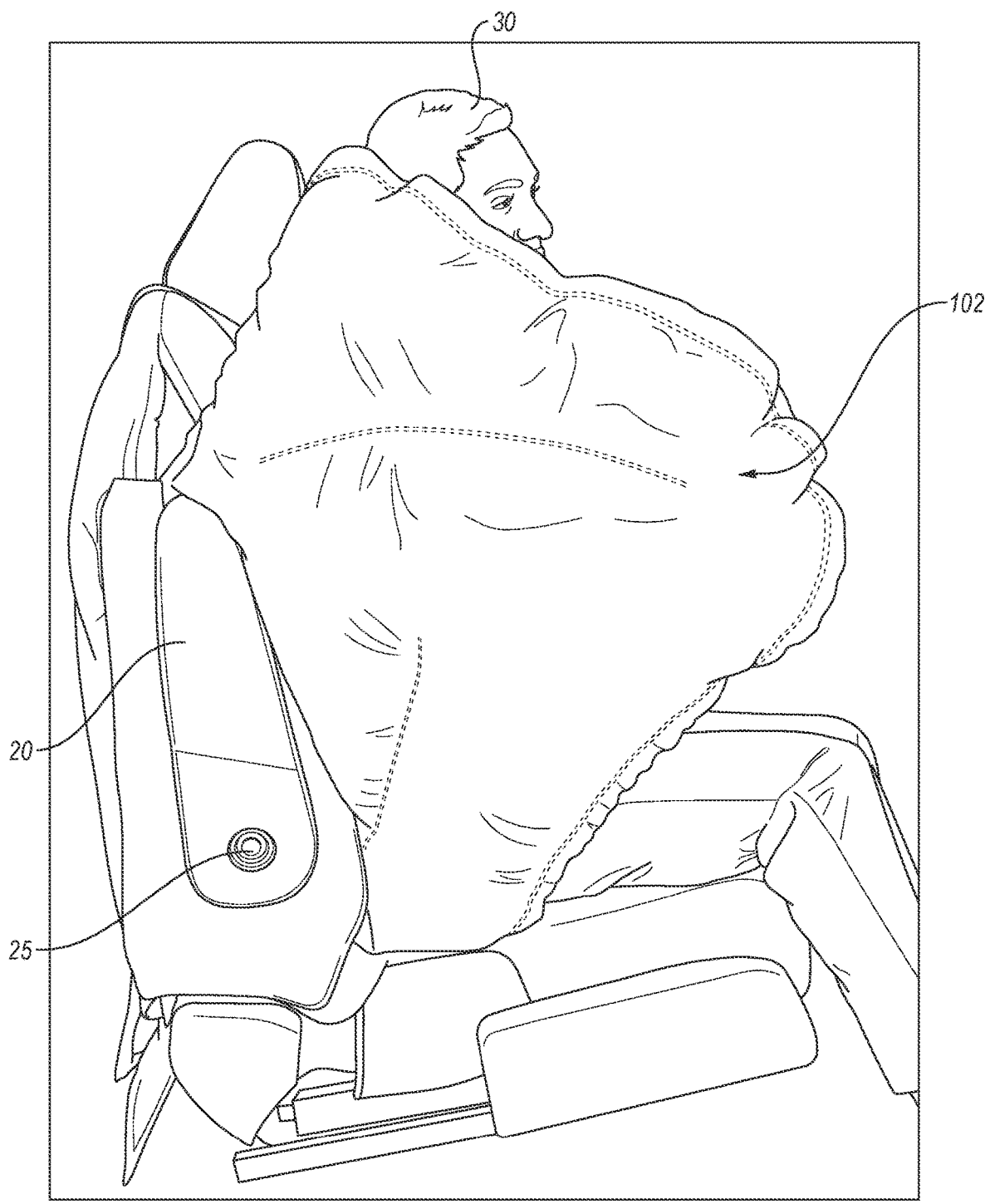
FIG. 3B depicts the seat-mounted and armrest coupled airbag module of FIG. 3A during deployment with the armrest in a retracted configuration.

FIG. 3B depicts deployment of airbag cushion 102 with armrest 20 in its retracted configuration in which armrest 20 is rotated up against seat 10. Again, module 100 is configured to facilitate deployment of airbag cushion 102 in either configuration.

Figure 4A:
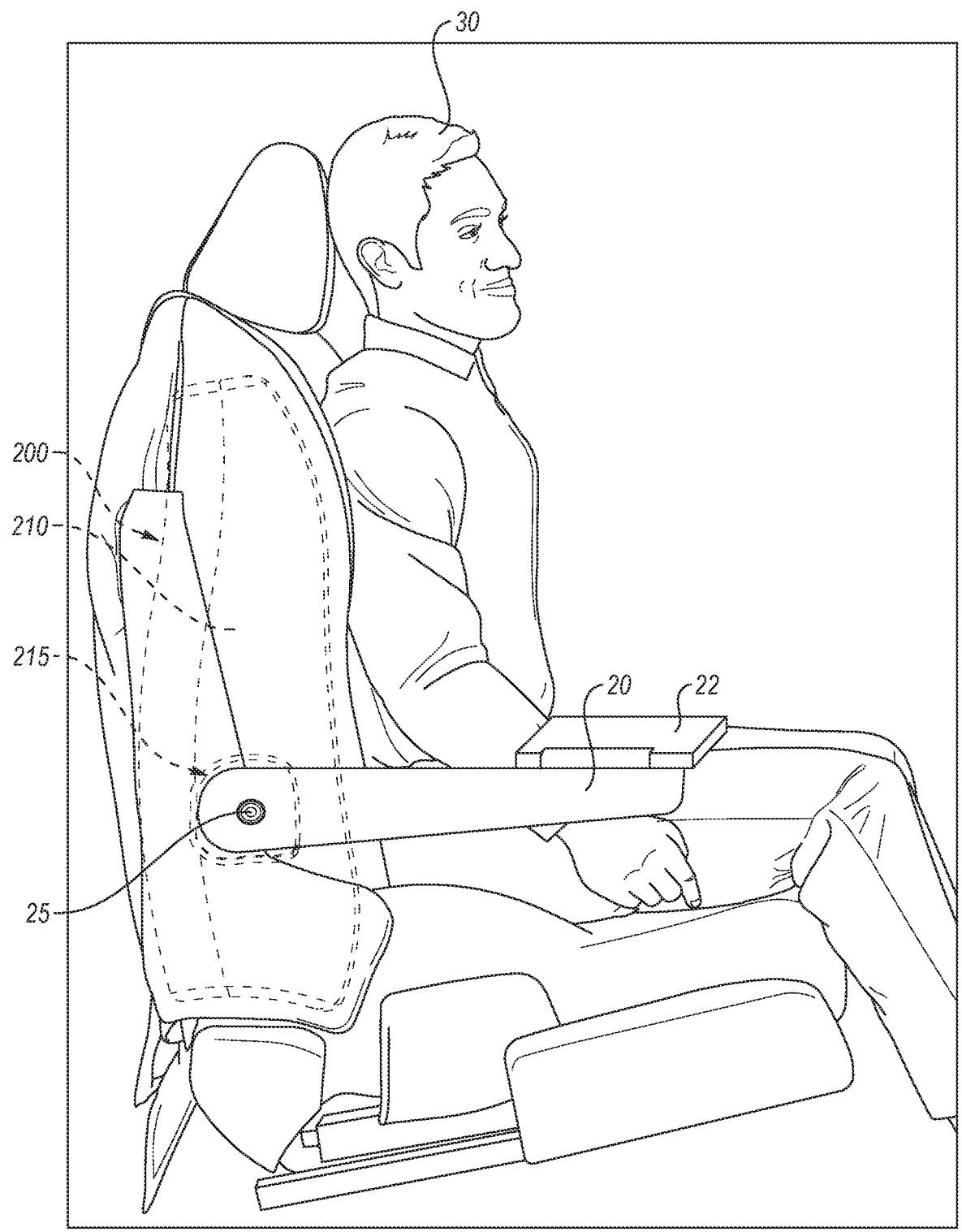
FIG. 4A depicts an alternative embodiment configured to deploy adjacent to a seat-mounted tray table.

FIG. 4A depicts an alternative embodiment of an airbag module 200 comprising a housing 210 with an opening 215 through which a tray table mount 25 extends. A tray table arm 20 is coupled with a table 22, which may retractably positionable adjacent to a vehicle occupant 30. Module 200 may therefore be particularly useful for, for example, autonomous vehicles. Housing 210 may therefore comprise, in some embodiments, a rigid, decorative cover that may be configured to both protect the airbag cushion or cushions therein (see cushions 202A and 202B in FIG. 4B) and may be mounted to or within the seat 10 with or without seat foam or a seat cover extending over the housing 210.

Figure 4B:
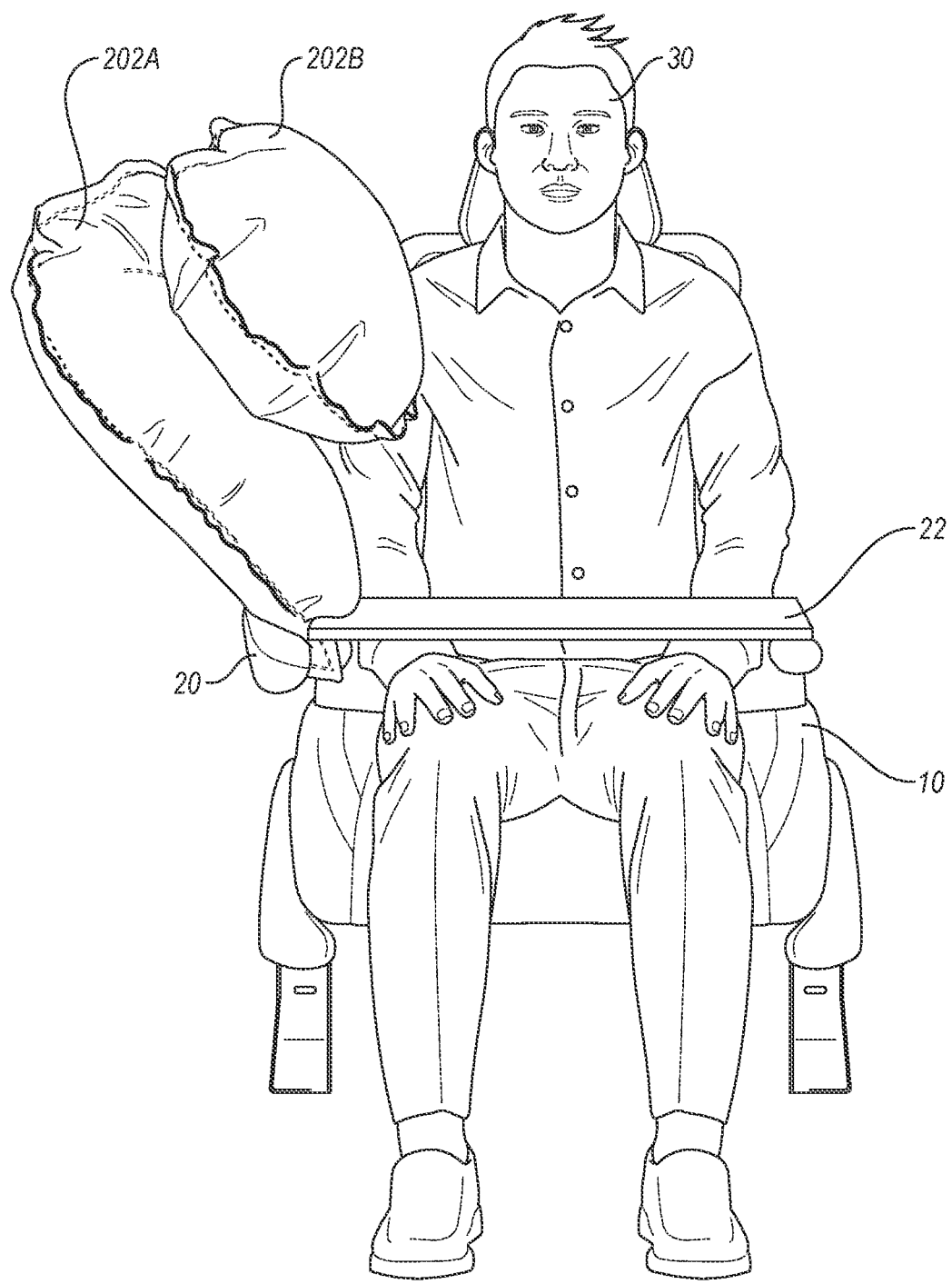
FIG. 4B is a front view depicting the embodiment of FIG. 4A during deployment.

As shown in FIG. 4B, in some embodiments, multiple cushions and/or cushion chambers may be provided. Thus, module 200 comprises a first or outer cushion chamber 202A and a second or inner cushion chamber 202B. Chambers 202A and 202B may be fluidly coupled such that a single inflator (not shown) may be used to inflate both cushions/chambers 202A/202B. Chamber 202B may be configured to provide specific protection primarily to the head of occupant 30, whereas chamber 202A may be configured to provide protection to the body of occupant 30 and/or to provide a foundation for stabilizing chamber 202B.

As also shown in FIG. 4B, a portion of chamber 202A or, a single cushion in alternative embodiments having only one, may be configured to deploy partially within a space in between arm 20 and table 22. Alternatively, however, the cushion(s) may simply be configured to deploy inside of arms 20 and table 22 such that these structural elements do not impede the ability of the cushion(s) to deploy. In addition, as previously discussed, preferably module 200 is configured to transfer forces from deployment of the airbag cushion(s) to at least a portion of the tray table assembly and/or the frame of seat 10 during deployment. Further, in some embodiments, airbag cover 210 is configured to be coupled to the vehicle seat 10 without use of bolts or screws coupled directly to cover 210 or, in some such embodiments, without the use of bolts or screws altogether.

Figure 4C:
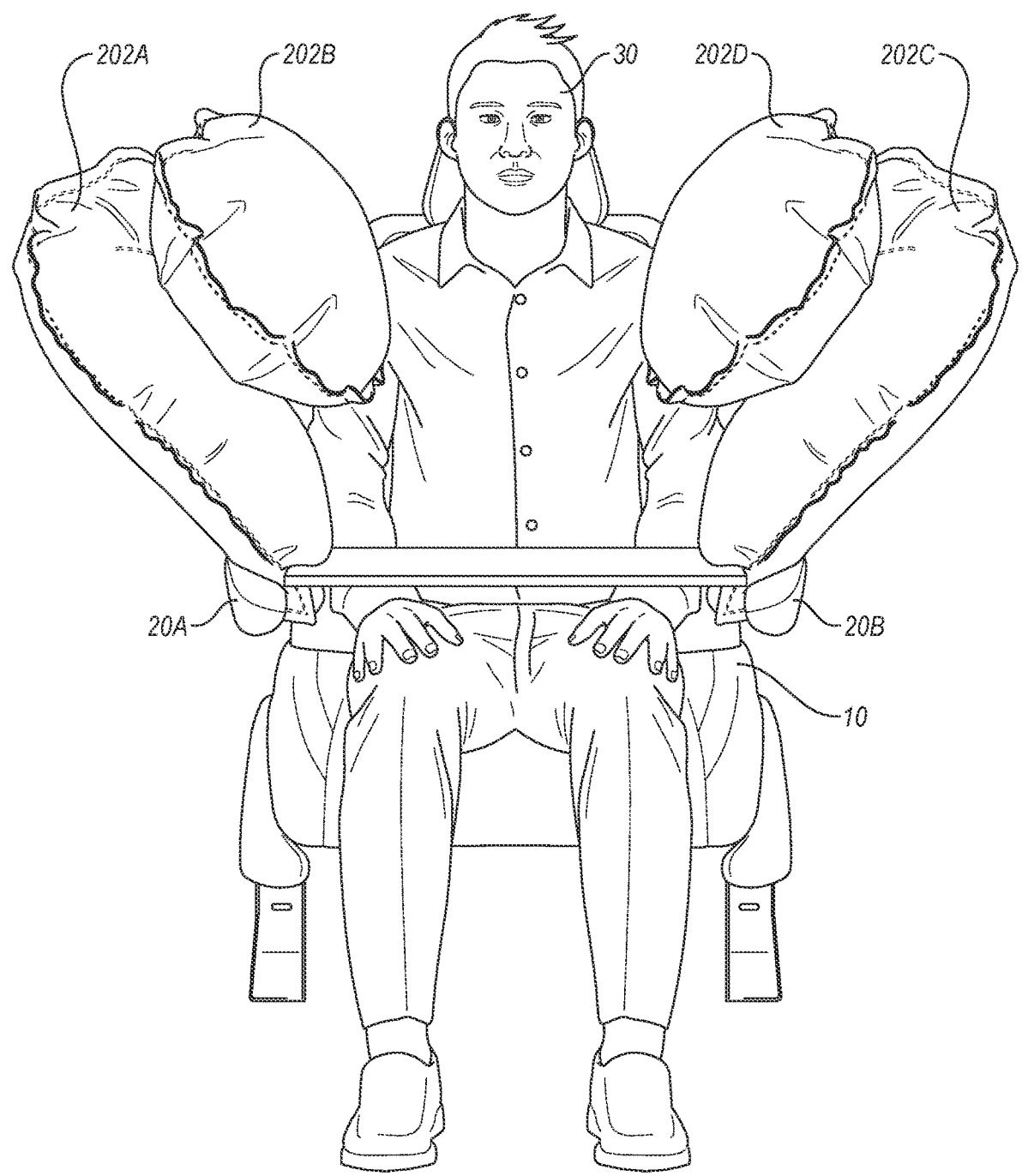
FIG. 4C is a front view depicting an alternative embodiment comprising cushions deployable from both sides of a vehicle seat during deployment.

As shown in FIG. 4C, in some embodiments, cushions may be deployable from both sides of a vehicle seat 10. Thus, in the depicted embodiment, a pair of cushions 202C and 202D is positioned on the opposite side of seat 10 relative to cushions 202A and 202B. Although not shown in this figure, it should be understood that cushions 202C and 202D (or, in alternative embodiments, only a single cushion)

may be deployable from a separate cover that may be positioned within or otherwise coupled to their respective side of seat 10.

In addition, in preferred embodiments, this separate cover may, like cover 210, comprise an opening, either full or partial, through which a structural element of seat 10, such as arms 20A and/or 20B, may extend. Other examples of seat structural elements that may extend through housings/covers of contemplated alternative embodiments and be used to transfer airbag deployment forces therethrough to the frame of the seat and/or vehicle include footrests, leg recliners, seat mount bars, a seat belt or a structural element of a seat belt assembly, and the like.

The foregoing specification has been described with reference to various embodiments and implementations. However, one of ordinary skill in the art will appreciate that various modifications and changes can be made without departing from the scope of the present disclosure. For example, various operational steps, as well as components for carrying out operational steps, may be implemented in various ways depending upon the particular application or in consideration of any number of cost functions associated with the operation of the system. Accordingly, any one or more of the steps may be deleted, modified, or combined with other steps. Further, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced, are not to be construed as a critical, a required, or an essential feature or element.

Those having skill in the art will appreciate that many changes may be made to the details of the above-described embodiments without departing from the underlying principles of the invention. The scope of the present invention should, therefore, be determined only by the following claims.

The invention claimed is:

1. A seat-mounted airbag module, comprising:
   an airbag cover configured to be positioned within a seat back of a vehicle seat;
   an inflator positioned within the airbag cover; and
   an airbag cushion positioned within the airbag cover and configured to deploy from one lateral side of the seat back adjacent to an armrest of the vehicle seat, wherein the airbag module is configured to transfer forces from deployment of the airbag cushion to at least a portion of an armrest assembly comprising the armrest during deployment.

2. The seat-mounted airbag module of claim 1, wherein the airbag cover comprises an opening configured to receive a portion of the armrest therethrough.

3. The seat-mounted airbag module of claim 2, wherein the opening is configured to receive an armrest mount of the armrest therethrough.

4. The seat-mounted airbag module of claim 1, wherein the airbag cover is configured to be coupled to the vehicle seat without use of bolts or screws.

5. The seat-mounted airbag module of claim 1, wherein the airbag cover comprises a clamshell cover comprising:
   a spine;
   a first cover piece pivotably coupled to the spine; and
   a second cover piece pivotably coupled to the spine.

6. The seat-mounted airbag module of claim 5, wherein the inflator is positioned along the spine.

7. An airbag module, comprising:
   an airbag cover configured to be positioned within a vehicle seat, wherein the airbag cover comprises an opening, and wherein the opening is configured to receive a structural element of the vehicle seat therethrough; and
   an airbag cushion positioned within the airbag cover and configured to deploy from the airbag cover such that forces from deployment of the airbag cushion are directed applied to the structural element.

8. The airbag module of claim 7, wherein the structural element comprises a portion of an armrest assembly.

9. The airbag module of claim 8, wherein the structural element comprises an armrest mount.

10. The airbag module of claim 7, further comprising an inflator, wherein the airbag cushion is separately coupled to the inflator on opposing sides of the inflator.

11. The airbag module of claim 10, wherein the airbag cushion is positioned within the airbag cover such that at least a portion of the airbag cushion extends about a periphery of the opening from a first side of the inflator to a second side of the inflator opposite the first side.

12. The airbag module of claim 7, wherein the airbag cover comprises a clamshell cover comprising:
   a spine;
   a first cover piece pivotably coupled to the spine; and
   a second cover piece pivotably coupled to the spine, wherein the airbag cushion is configured to deploy from along an edge of the airbag cover positioned opposite from the spine.

13. A vehicle seat, comprising:
   a seat base;
   a seat back extending from the seat base;
   a structural assembly comprising a protruding member extending from at least a portion of the vehicle seat; and
   an airbag module positioned within the vehicle seat, wherein the airbag module comprises:
      an airbag cover comprising an opening, wherein the protruding member extends through the opening; and
      an airbag cushion positioned within the airbag cover and configured to deploy from the airbag cover along one side of the vehicle seat.

14. The vehicle seat of claim 13, wherein the protruding member comprises an armrest.

15. The vehicle seat of claim 14, wherein the armrest is adjustable between upright and extended positions, wherein the airbag cushion is configured to deploy adjacent to the armrest in either the upright or extended positions, and wherein the airbag cushion is configured to deploy adjacent to an inner surface of the armrest in the extended position.

16. The vehicle seat of claim 13, wherein the airbag module is positioned and configured to transfer forces from deployment of the airbag cushion to the protruding member during deployment.

17. The vehicle seat of claim 16, wherein the airbag module is positioned and configured to transfer reaction forces from an occupant contacting the airbag cushion during deployment to the protruding member and from the protruding member to a frame of the vehicle seat during deployment.

18. The vehicle seat of claim 13, wherein the airbag module is positioned within the seat back.

19. The vehicle seat of claim 18, wherein the airbag cover is coupled to the seat back without use of bolts or screws.

20. The vehicle seat of claim 19, wherein the airbag module further comprises an inflator configured to inflate the airbag cushion, and wherein the inflator is coupled to the seat back using one or more inflator studs.

* * * * *